UNITED STATES PATENT OFFICE.

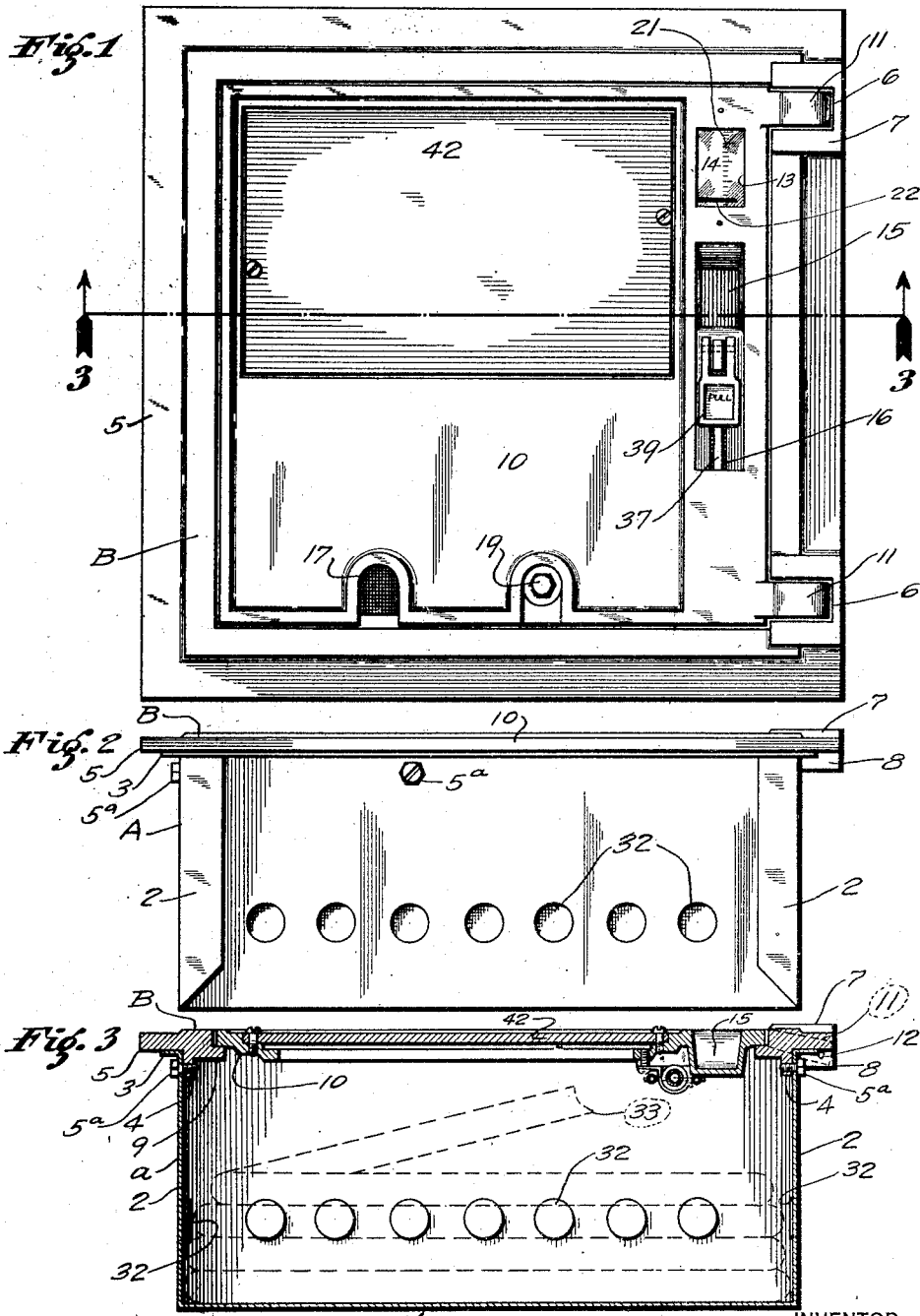

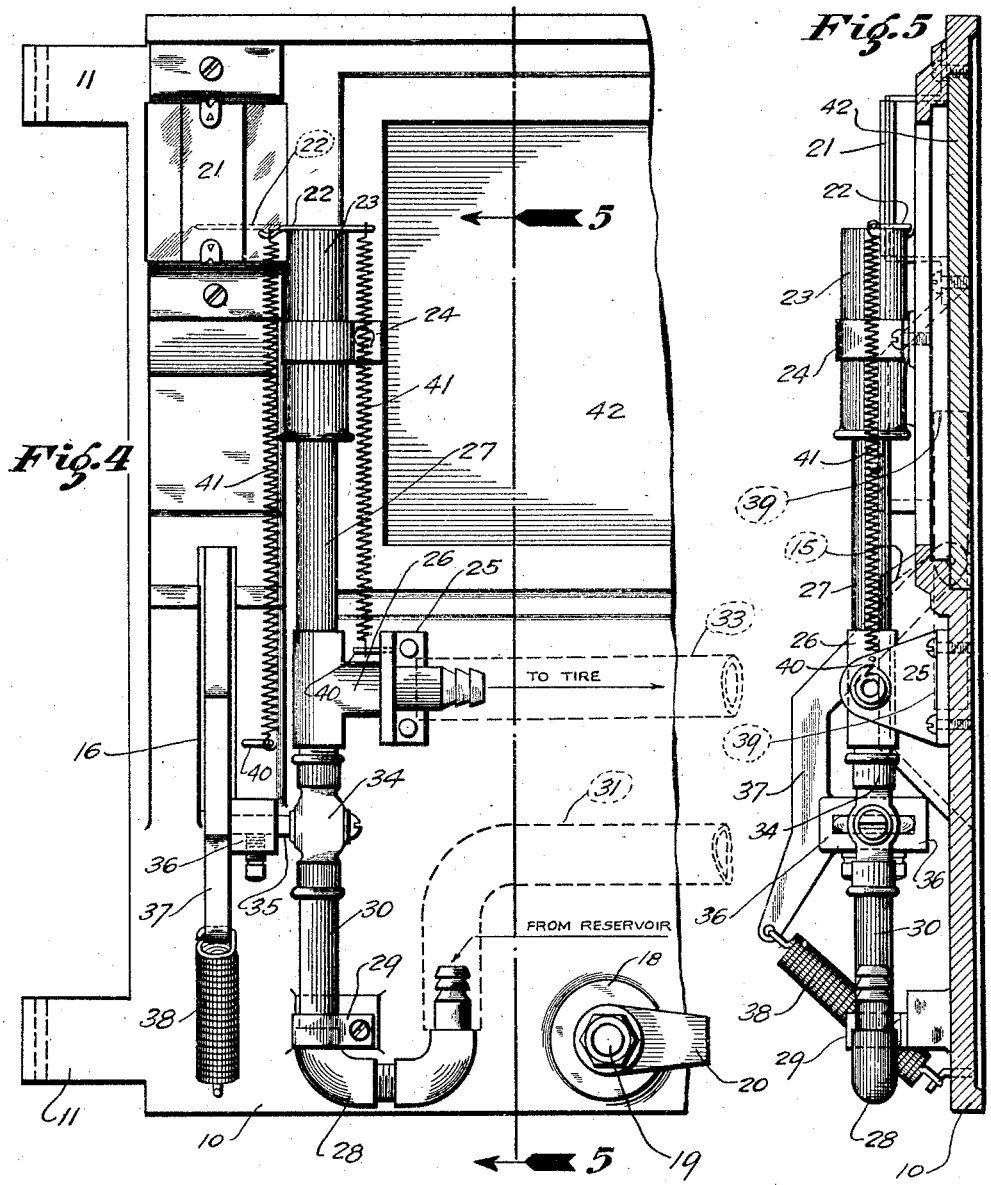

GEORGE McD. JOHNS, OF ST. LOUIS, MISSOURI.

AIR-SERVICE STATION.

1,364,378.  Specification of Letters Patent.  Patented Jan. 4, 1921.

Application filed January 24, 1919. Serial No. 272,945.

*To all whom it may concern:*

Be it known that I, GEORGE McD. JOHNS, a citizen of the United States, and a resident of the city of St. Louis, State of Missouri, have invented a certain new and useful Air-Service Station, of which the following is a specification, reference being had to the accompanying drawings, forming a part thereof.

This invention relates to a certain new and useful air service station which is especially adapted for use in connection with automobile pneumatic-tires and the inflation thereof.

The chief objects of my present invention are to provide a simple, compact, and efficient station of the kind and for the purpose stated which may be inexpensively installed attractively at any desired location and, when installed in a curb, sidewalk, or street, offers little obstacle or obstruction to pedestrians or passing automobiles, vehicles, or the like; to provide a station of the kind and for the purpose stated which automatically cuts off the supply of air as soon as the operator is finished using and thereby effects an economical use of air without wastage; to provide a station of the kind and for the purpose stated which is adapted to gage and indicate to the operator the air-pressure within the tire both prior and subsequent to inflation; and to provide a station of the kind and for the purpose stated which is readily usable with facility and convenience by the operator.

With the above and other objects in view, my invention resides in the novel features of form, construction, arrangement, and combination of parts hereinafter described and afterward pointed out in the claims.

In the accompanying drawings,

Figure 1 is a plan view of an air service-station embodying my invention;

Fig. 2 is a side elevational view of the same;

Fig. 3 is a transverse sectional view on approximately the line 3—3, Fig. 1;

Fig. 4 is an enlarged fragmental inverted plan view of the lid or cover of the station and its associated parts;

Fig. 5 is a sectional view through the station-lid or cover on approximately the line 5—5, Fig. 4; and Fig. 6 is a fragmental view of the lid or cover, showing the catch for locking the lid or cover in closed position.

Referring to the said drawings, in which like reference characters refer to like parts throughout the several views, the station includes a preferably rectangular sheet-metal open-top box or casing A comprising a bottom wall 1 and side walls 2, each of the walls 2 being preferably provided at its upper edge with an outwardly presented flange 3.

Having an integral downwardly presented flange 4 disposed within the casing A and abutting against the inner face of its walls 2 at their upper end, and also having an integral outwardly presented marginal portion 5 resting upon the flanges 3, as illustrated particularly in Fig. 3, is a correspondingly rectangular preferably cast top-frame B rigidly fixed to the casing A by bolts or other fastening-members 5ª passed through the flange 4 and the walls 2. In use, the box or casing A is adapted to be set in a wall, curb, side-walk, street, or other desired location with the upper or outer face of frame B substantially flush with the surrounding surface of such wall, curb, side-walk, street, or the like, the marginal portion 5 of the frame B providing in the installation a neat trim for the station.

At one side-edge, as seen in Fig. 1, the frame B and its marginal portion 5 are cut away outwardly to provide approximately rectangular spaced pockets 6—6 open at their inner end, each pocket 6 being provided therearound, for neatness in appearance, upon the upper face of the frame B with a rim, as at 7, and the frame B being integrally thickened at the sides of each pocket 6 to provide pocket-walls, as at 8. Extending around within the frame B on a plane below the upper face thereof is a ledge 9 adapted to provide a seat for a station-lid or cover 10, which at one side edge is provided preferably integrally with projecting hinge-ears 11—11 adapted to fit the pockets 6 and to the side walls 8 of which the hinge-ears 11 are pivotally connected as by hinge-pintles 12, whereby the lid or cover 10 may be conveniently swung to open or closed position relatively to the casing A and the lid-seat 9, the lid or cover 10, when in closed position, being countersunk in the frame B with its upper face substantially flush with the upper face of frame B, as seen particularly in Fig. 3.

Preferably adjacent its hinged-side, the lid or cover 10 is cut away, as at 13, to provide a sight-opening, which is preferably closed by a section of suitable transparent material 14 suitably fixed to the lid 10. Also integrally formed in the lid 10 at its said hinged-side and preferably in alinement with the sight-opening 13, is an elongated sunken trough 15 provided longitudinally in its bottom wall for a portion of its length with a slot, as at 16.

At another side edge, as seen in Fig. 1, the lid or cover 10 is cut away to provide a preferably U-shaped opening, as at 17, for purposes hereinafter appearing; and adjacent the opening 17, the lid or cover 10, as seen in Figs. 1 and 6, is provided on its under face with a bored boss 18, mounted for rotatory movement in which is a pin 19 having fixed thereto at its inner end a latching-member 20 adapted, on proper rotatory movement of the pin 19, to engage the under face of lid-supporting ledge 9 to releasably lock the lid or cover 10 in closed position. As particularly indicated by dotted lines in Fig. 6, the lid 10 and the upper portion of its boss 18 are cut away to provide a countersunk seat for the head of pin 19, whereby the pin 19 may be conveniently operatively engaged by a suitable tool and at the same time offers no obstacle or obstruction to pedestrians or passing vehicles and the like.

Suitably fixed to and upon the under face of the lid or cover 10, in order that it may be visually apparent through the glass-covered sight-opening 13, is an air-pressure scale or gage 21, coöperating with the transparent movably disposed between the transparent section 14 and the gage 21, is an indicating-pointer 22 fixed to and substantially forming part of a plunger (not shown) working in a suitable cylinder 23, which may be a part of any standard air-pressure gage and which is rigidly operatively fixed, as by a bracket 24, to and upon the under face of the lid or cover 10, as seen in Figs. 4 and 5.

Also fixed, as by a bracket 25, to and upon the under face of the lid 10, is a suitable preferably T-shaped coupling 26 in open communication through one branch and a pipe 27 with the cylinder 23. Adapted to provide communication between the opposite branch of the coupling 26 and a suitable preferably U-shaped coupling 28, also fixed, as by a bracket 29, to and upon the under face of the lid 10, is a connecting pipe-section 30, the other end of the coupling 28 being adapted for connection with one end of a flexible pipe or hose 31 adapted for connection at its other end with an air-reservoir or other suitable source of supply, not shown. The side walls 2 of the casing A are each, preferably in course of production, provided with a plurality of so-called knock-outs 32, whereby the pipe or hose 31 may be conveniently led from the casing A selectively through either of its walls 2 and connected up with the air-supply as may best meet the requirements of any particular installation or location. The central branch of the coupling 26 is also adapted for connection with one end of an elongated flexible pipe or hose 33, which is adapted, when the station is in service, to lead outwardly from the casing A through the lid-aperture 17 and to be connected at its free end with the tire to be inflated. When the station is not in service, the tire-hose 33 may be conveniently coiled and contained with safety within the casing A, as indicated by dotted lines in Fig. 3.

Interposed in the pipe 30 for controlling and regulating the flow of air from the reservoir-pipe 31 to the tire-hose 33, is a suitable valve 34 having an outwardly projecting rotarily movable stem 35. Fixed intermediate its ends, as by a lateral slotted projection 36, to and upon the stem 35, and thereby pivoted to swing relatively to the lid 10, is a valve-operating lever 37 having preferably the shape in side elevation seen especially in Fig. 5, one end of lever 37 projecting exteriorly of the casing A through the trough-slot 16 and the other end of the lever 37 having attached thereto one end of a coiled spring 38 disposed within the casing A with its other end attached to the under side of lid 10 for yieldingly holding the lever 37 normally in valve-closing position. Pivoted upon the outwardly projecting end of lever 37, is a hand-grasp 39 adapted to neatly rest within trough 15 when the lever 37 is in valve-closing position and thereby also offer no obstacle or obstruction to pedestrians, passing vehicles, and the like.

Having one end attached to the indicating-pointer 22 and their other end attached to hooks or the like 40—40 suitably positioned upon the under face of the lid 10, are coiled springs or other elastic members 41 for yieldingly holding the pointer 22 normally in zero position.

In use or operation, presuming lid 10 to be locked in closed position and tire-hose 33 extending outwardly of the casing through said aperture 17, the operator applies the free end of hose 33 to the valve of the tire to be inflated, whereupon the air-pressure within the tire, through the pressure so applied upon the cylinder-plunger, is at once registered upon the gage 21 and visibly indicated to the operator by the pointer 22. To increase the air-pressure as may be desired within the tire, the operator grasps the convenient lever-piece 39 and pulls the lever 37 against the tension of its restoring spring 38, thereby opening the valve 34 and permitting air from the reservoir or other source of supply to flow into the tire being inflated. On at any time releasing the lever 37, and thereby automatically closing the valve 34 and cutting off communication between the tire and the reservoir, the back flow of fluid from the tire at once exerts pressure on the gage-plunger, which pressure is visibly registered on the scale 21 by the pointer 22, whereby the operator or user may at any time during tire-inflation ascertain most conveniently the exact air-pressure within the tire and thereby obviate so-called tire "blow-outs."

As seen especially in Figs. 1 and 3, the lid or plate 10 includes a conveniently detachable panel 42 adapted to bear thereupon the name of the proprietor of the station or such other inscriptions or the like as may be desired.

My new air-service-station is most compact, may be inexpensively manufactured and inexpensively installed at any desired location and when installed is quite attractive in appearance, is conveniently usable and is efficient in operation, and provides a protective containing-housing for the air-supply connections, and as will be noted, substantially all working parts are arranged on the lid 10 and hence are conveniently exposed exteriorly of the casing for repairs or adjustments when the lid is swung to open position.

It is to be understood that changes in the form, construction, arrangement, and combination of the several parts of my new station may be made and substituted for those herein shown and described without departing from the nature and principle of my invention.

Having thus described my invention, what I claim and desire to secure by Letters Patent is:

1. An air-service station comprising a casing, in combination with an apertured and slotted closing-lid hinged to the casing, a pipe-coupling fixed to and upon the inner face of the lid, a tube having communication at one end upon the inner face of the lid with the coupling and adapted for projection through the casing to connect with a source of fluid-supply, a second tube also having communication at one end upon the inner face of the lid with the coupling and adapted for projection through the aperture of the lid for connection at its other end with a tire to be inflated, a valve upon the inner face of the lid for controlling communication between the tubes, and a lever having engagement with the valve for operating the same, the lever having a portion disposed for movement in the slot of the lid, the tubes permitting hinged movement of the lid relatively to the casing, and the parts carried by the lid being exposed for repairs exteriorly of the casing when the lid is swung to open position and being housed and concealed within the casing when the lid is in casing-closing position.

2. An air-service station comprising a casing, in combination with a closing-lid having a sight opening hinged to the casing, a T-coupling fixed on the inner face of the lid, a tube having communication at one end upon the inner face of the lid with an end of the coupling and adapted for connection at its other end with a tire, a second tube having communication at one end upon the inner face of the lid with another end of the coupling and adapted for connection at its other end with a source of fluid supply, a valve upon the inner face of the lid for controlling communication between the tubes, a lever having engagement with the valve for operating the same, the lever having a portion disposed for movement in the lid, and an air-gage fixed to and upon the inner face of the lid and having communication for the purposes described with the third end of the coupling, the gage including a scale and pointer visible at said sight-opening when the lid is in closed condition, the tubes permitting hinged movement of the lid relatively to the casing, and the parts carried by the lid being exposed for repairs exteriorly of the casing when the lid is swung to open position and being housed within the casing when the lid is in closed position.

3. An air-service station comprising, in combination, a plate, a T-coupling fixed on the plate, a tube having communication at one end with an end of the coupling and adapted for connection at its other end with a source of fluid supply, a second tube having communication with another end of the coupling and adapted for connection at its other end with a tire, and an air-pressure gage fixed to the plate substantially as and for the purposes described, the gage having communication with the third end of the coupling.

In testimony whereof, I have signed my name to this specification.

GEORGE McD. JOHNS.